3,850,903
Patented Nov. 26, 1974

PLASMA VOLUME EXPANDER PREPARED FROM COHN IV PRECIPITATE USING BLOCK COPOLYMERS OF ETHYLENE OXIDE AND POLYOXYPROPYLENE

Luis A. Garcia, 19941 Carmania Lane, Huntington Beach, Calif. 92646; Jose R. Boullon, 12672 Twintree Lane, Garden Grove, Calif. 92640; and Samia S. Mankarious, 2728 Canary Drive, Costa Mesa, Calif. 92626
No Drawing. Filed June 21, 1973, Ser. No. 372,362
Int. Cl. C07g 7/00
U.S. Cl. 260—112 B                           4 Claims

ABSTRACT OF THE DISCLOSURE

A plasma volume expander is prepared from Cohn IV-4 Precipitate by treatment with calcium phosphate and fibrinogen followed by selective precipitation with block copolymers of ethylene oxide and polyoxypropylene polymer.

---

This invention relates to a method of fractionating blood. More particularly, this invention relates to a method of fractionating Cohn Precipitate IV-4 to remove residual clotting factors and lipids and to prepare a concentrate rich in albumin, transferrin and other $\alpha$- and $\beta$-globulins suitable for intravenous administration.

Cohn Precipitate IV-4 is a fraction of blood obtained in the main fractionation of plasma by Method 6 of Cohn, J. Amer. Chem. Soc., Vol. 68, pp. 459–75 (1946); Kirk-Othmer, Encyl. of Chem. Tech., Vol. 3, pp. 584–88 (2d ed. 1964).

Cohn Precipitate IV-4 consists principally of albumin together with some $\alpha$- and $\beta$-globuins. In addition, the esterase activity of plasma and a portion of the globulins hypertensinogen and transferrin are found in this fraction. Certain amounts of residual clotting factors (principally prothrombin) and lipids also are present in Cohn Precipitate IV-4.

Cohn Precipitate IV-4 finds use as a plasma volume expander. For such use it is desired to have a product which is free of clotting factors and lipids and rich in albumin.

Accordingly, it is an object of the present invention to provide a method of fractionating Cohn Precipitate IV-4 to remove residual clotting factors and lipids and to prepare a concentrate rich in albumin, transferrin and other $\alpha$- and $\beta$-globulins suitable for intravenous administration.

In accordance with the practice of this invention, residual clotting factors and lipids are removed from Cohn Precipitate IV-4 by adsorption with calcium phosphate and fibrinogen and then the product is further concentrated by precipitation with certain block copolymers which are ethylene oxide-propylene glycol condensation products.

In order to facilitate removal of the clotting factors and lipids from Cohn Precipitate IV-4, it is preferable to suspend the starting material in aqueous solution, and preferablly physiological normal saline (0.9% NaCl), to a concentration of from about 1% to about 2% protein.

Adsorption with calcium phosphate is carried out by adjusting the pH of the resuspended Cohn IV-4 Precipitate to a range of about 6.5–7.5 and thoroughly mixing with about 0.5–2% calcium phosphate. The preferred calcium phosphate is tricalcium phosphate having the formula $Ca_{10}(OH)_2(PO_4)_6$. The resulting precipitate is separated from the mixture, such as by centrifugation, and discarded. Fibrinogen is then added to the retained supernatant to a concentration of about 0.05–0.2% and thoroughly mixed in the suspension. The resulting mixture is then retained for fractionation with the block copolymers.

The ethylene oxide-propylene glycol condensation products employed as the block copolymers in this invention can be prepared by condensing ethylene oxide with polyoxypropylene polymer. A further description of the preparation of these block copolymers is found in U.S. Pat. 2,674,619. These block copolymers can be represented by the following structural formula:

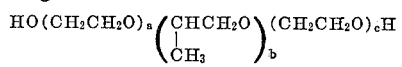

For purposes of this invention, these block copolymers desirably contain at least 50% ethylene oxide in the molecule and a polyoxypropylene hydrophobic base molecular weight of at least 950. Materials containing less than 50% ethylene oxide and products having a hydrophobic base molecular weight less than 950 do not have the desired solubility and non-toxic characteristics. In this respect, the block copolymers employed in this invention are related to and include materials used as blood plasma substitutes and for priming heart-lung apparatus as described in U.S. Pats. 3,450,502, 3,577,522 and 3,590,125, which are incorporated herein by reference. Said materials are described in U.S. Pat. 3,450,502, as compounds having the formula $HO(C_2H_4O)_b(C_3H_6O)_a(C_2H_4O)_bH$ wherein $a$ is an integer such that the hydrophobe base represented by $(C_3H_6O)$ has a molecular weight of at least 950 and $b$ is an integer such that the hydrophile portion represented by $(C_2H_4O)$ constitutes from about 50% to about 90% by weight of the compound.

Ilustrative examples of suitable block copolymers are the F-38 and F-68 "Pluronic" polyols sold by Wyandotte Chemicals Corp. F-38 contains 80% of polyoxyethylene hydrophilic units in the molecule and the polyoxypropylene hydrophobic base has a molecular weight of 950. F-68 also contains 80% of polyoxyethylene hydrophilic units in the molecule but the hydrophobic base has a molecular weight of 1750. The total molecular weight of these two "Pluronic" polyols is 4750 and 8750, respectively. A further description of these polyols is found in the bulletin of Wyandotte Chemicals Corp. "The Pluronic Grid," Sixth Edition, which is incorporated herein by reference.

Precipitation with the foregoing block copolymers is carried out at two different concentration levels, each at a different pH. First, the retained mixture from the treatment with fibrinogen and calcium phosphate is adjusted to a pH of 6–7 and thoroughly mixed with the block copolymer to a concentration of from about 13.5% to about 17.5%. The resulting precipitate is then separated from the mixture, such as by centrifugation, and the supernatant is retained. Secondly, the latter supernatant is thoroughly mixed with the block copolymer to a final concentration of from about 18% to about 20%. The suspension is then cooled to about 3–5° C., the pH is adjusted to 4–5 with acetate buffer (0.8 molar sodium acetate, 4 normal acetic acid, pH 4) and the suspension again thoroughly mixed. The resulting precipitate is then separated, such as by centrifugation, and retained as the desired purified Cohn Precipitate IV-4.

In a preferred embodiment of the invention, the retained supernatant from the treatment with fibrinogen and calcium phosphate is initially treated with the block copolymer at a third concentration level to precipitate kininogen. This protein may release bradykinin which, in turn, is known to cause a drop in blood pressure. The kininogen is removed by thoroughly mixing the retained supernatant with the block copolymer at a concentration of from about 4% to about 6% and a pH of about 4–5. The resulting precipitate is separated from the mixture, such as by centrifugation, and the supernatant is retained for treatment with the block copolymer at the two higher concentration levels as above.

The following examples will further illustrate the invention although the invention is not limited to these specific examples.

EXAMPLE 1

A Cohn Fraction IV-4 paste is suspended in physiological normal saline (0.9% NaCl) to a concentration of 1.5 gm. percent (grams/100 ml.) and the pH maintained at 7. Tricalcium phosphate [$Ca_{10}(OH)_2(PO_4)_6$] is added to a concentration of 1.5 gm. percent and the suspension is thoroughly mixed for 60 minutes at room temperature (about 25° C.). The mixture is then centrifuged and the precipitate is discarded. Fibrinogen is then added to the retained supernatant to a concentration of 0.1 gm. percent and mixing is continued for another 60 minutes at room temperature. The mixture is then retained for the next step.

The pH of the retained mixture is adjusted to 6.5 and "Pluronic" F-38 is added to a concentration of 17 gm. percent. The suspension is mixed for 1.5 hours at room temperature and centrifuged. The precipitate is discarded and "Pluronic" F-38 is then added to the supernatant to increase its concentration therein to 19 gm. percent. The suspension is mixed for 1.5 hours at room temperature and then cooled to 4° C. The pH is adjusted to 4.5 with acetate buffer (0.8 molar sodium acetate in 4 normal acetic acid, pH 4). Mixing is continued for 30 minutes at 4° C. and the mixture centrifuged. The resulting precipitate is separated from the supernatant and suspended in distilled water to a concentration of 4 gm. percent protein and the pH is adjusted to 7.2. The resuspended product is retained as the desired purified Cohn Fraction IV-4.

The above purified product is adjusted to an electrolyte content of 140 meq. Na+, 4.5 meq. K+, and 100 meq. Cl− per liter. Thn 0.004 M sodium caprylate and 0.004 M aceyltryptophanate is added as a stabilizer, the product is heated at 60° C. for two hours, clarified by filtration through asbestos pads, sterile filtered through 0.22μ "Millipore" membrane filters and heated at 60° C. for another ten hours.

The final product prepared according to the foregoing example contains about 50–60% albumin, 10–12% transferrin and 20–30% α- and β-globulins. The thrombin activity is less than 0.003μ per ml. When adjusted to a protein concentration of 4%, the final product has an osmolarity similar to that of a 5% albumin solution.

EXAMPLE 2

A Cohn Fraction IV-4 paste is dissolved in normal physiological saline to a concentration of about 1–1.5 gm. percent and the pH is adjusted to 7.2±0.1. About 0.5 gm. percent tricalcium phosphate is then added and the suspension is mixed for about 30 minutes at room temperature. The mixture is centrifuged and the resulting precipitate is discarded. The retained supernatant is mixed with a fibrinogen solution to a concentration of about 0.05 gm. percent for about 1–2 hours at room temperature.

The suspension is then cooled to 5° C. and the pH is adjusted to 6.5 with 1N HCl. "Pluronic" F-38 is added to a concentration of 14 gm. percent and the suspension is mixed for about 1–2 hours at 5° C. and centrifuged. The precipitate is discarded and the supernatant filtered. The filtrate is then adjusted to a "Pluronic" F-38 concentration of 19 gm. percent and to a pH of 4.5±0.1 with acetate buffer. The suspension is mixed for 1–2 hours, centrifuged at 5° C. and the resulting precipitate is retained as the desired purified Cohn Fraction IV-4.

The above retained precipitate is suspended in distilled water to a concentration of 4.0±0.3 gm. percent protein; the electrolyte content (Na+, K+, Cl−) is adjusted to that of normal plasma; and the pH is made 7.2±0.2. The suspension is then heated for 2 hours at 60° C. in the presence of sodium caprylate and acetyltryptophanate stabilizer; clarified by filtration through asbestos pads, sterile filtered through 0.22μ "Millipore" membrane filters and then heated at 60° C. for another 10 hours. The final product is dispensed in 250 ml. aliquots.

EXAMPLE 3

A Cohn Fraction IV-4 paste is dissolved in normal physiological saline, adsorbed with tricalcium phosphate and treated with fibrinogen as in Example 2.

The suspension is then brought to pH 4.6 with 1N HCl and "Pluronic" F-38 is added to a concentration of 5%. After mixing for one hour at room temperature, the mixture is centrifuged and the precipitate discarded. The "Pluronic" polymer concentration is then adjusted to 17% concentration at pH 6.5 and the suspension mixed for 1–2 hours. The precipitate obtained by centrifugation is discarded and the retained supernatant adjusted to a "Pluronic" polymer concentration of 19%. After mixing one hour, the suspension is cooled to 5° C., and the pH is adjusted to 4.5±0.1 with acetate buffer. Mixing is continued for another hour and the suspension is then centrifuged at 5° C. The precipitate is suspended in distilled water, the electrolyte concentration is adjusted to that of plasma and the product heat treated as in Example 2. The product was found to be free of kinin-like activity upon *in vivo* administration by infusion in dogs. No blood pressure lowering effect was observed with this product whereas a blood pressure lowering effect was observed with another product which was the same except that it was not treated with the "Pluronic" polymer at the 5% level.

EXAMPLE 4

The procedures of Examples 1, 2 and 3 are repeated except that "Pluronic" F-38 is substituted for an equivalent amount of the "Pluronic" F-38 with substantially similar results.

Various other examples and modifications of the foregoing examples will be apparent to those skilled in the art without departing from the spirit and scope of the invention. All such further examples and modifications are included within the scope of the appended claims.

What is claimed is:

1. A process for the preparation of a blood fraction containing a high concentration of albumin, α- and β-globulins suitable for intravenous administration comprising fractionating Cohn Precipitate IV-4 by thoroughly admixing with about 0.5% to about 2% calcium phosphate, separating the resulting precipitate therefrom and thoroughly admixing the retained supernatant with about 0.05% to 0.2% fibrinogen and then thoroughly admixing with a compound of the formula

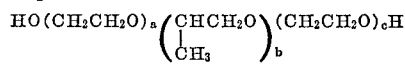

wherein $a$ and $c$ are integers such that the hydrophile portion represented by ($CH_2CH_2O$) constitutes at least about 50% of the molecule and $b$ is an integer such that the hydrophobic portion represented by

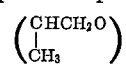

has a molecular weight of at least about 950 to a concentration of from about 13.5% to about 17.5% at a pH of about 6–7, separating the resulting precipitate therefrom and thoroughly admixing the retained supernatant with said compound to a concentration of from about 18% to about 20% at a pH of about 4–5, and recovering the resulting precipitate for retention as the desired blood fraction.

2. The process of Claim 1 in which the block copolymer contains about 80% of polyoxyethylene hydrophilic units in the molecule and the polyoxypropylene hydrophobic base has a molecular weight of about 950.

3. The process of Claim 1 including the additional step of removing kinin-like activity from the blood fraction by initially thoroughly admixing the supernatant retained from the treatment with fibrinogen and calcium phosphate with said block copolymer to a concentration of from about 4% to about 6% at a pH of about 4-5, separating the resulting precipitate therefrom and retaining the supernatant for treatment with said block copolymer at the two higher concentration levels.

4. The process of Claim 3 in which the block copolymer contains about 80% of polyoxyethylene hydrophilic units in the molecule and the polyoxypropylene hydrophobic base has a molecular weight of about 950.

References Cited
UNITED STATES PATENTS
3,770,631  11/1973  Fekete et al. _____ 210—53

OTHER REFERENCES
Merck Index, 1968, p. 457.

HOWARD E. SCHAIN, Primary Examiner

U.S. Cl. X.R.
424—101, 177

UNITED STATES PATENT OFFICE
CERTIFICATE OF CORRECTION

Patent No. 3,850,903      Dated November 26, 1974

Inventor(s) Luis A. Garcia, Jose R. Boullon and Samia S. Mankarious

It is certified that error appears in the above-identified patent and that said Letters Patent are hereby corrected as shown below:

In the specification, col. 4, line 36, cancel "F-38" and insert --F-68--.

Signed and sealed this 11th day of February 1975.

(SEAL)
Attest:

RUTH C. MASON
Attesting Officer

C. MARSHALL DANN
Commissioner of Patents
and Trademarks